(12) United States Patent
Guillon et al.

(10) Patent No.: US 7,771,703 B2
(45) Date of Patent: Aug. 10, 2010

(54) IZM-1 CRYSTALLINE SOLID AND A PROCESS FOR ITS PREPARATION

(75) Inventors: Emmanuelle Guillon, Vernaison (FR); Johan Mariens, Huldenberg (BE); Nicolas Bais, Feyzin (FR); Antoine Fecant, Brignais (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 184 days.

(21) Appl. No.: 12/022,585

(22) Filed: Jan. 30, 2008

(65) Prior Publication Data

US 2009/0192031 A1   Jul. 30, 2009

(30) Foreign Application Priority Data

Jan. 30, 2007   (FR) .................................. 07 00698

(51) Int. Cl.
 *C01B 39/48* (2006.01)
 *C01B 39/04* (2006.01)
(52) U.S. Cl. ..................... 423/703; 423/706; 423/718
(58) Field of Classification Search ................ 423/703, 423/718, 706, 708
See application file for complete search history.

(56) References Cited

U.S. PATENT DOCUMENTS

| | | | | |
|---|---|---|---|---|
| 4,357,264 A | * | 11/1982 | Chu | ............................. 502/77 |
| 4,359,595 A | * | 11/1982 | Rollmann | ................... 585/640 |
| 4,397,827 A | * | 8/1983 | Chu | ........................... 423/705 |
| 4,868,145 A | * | 9/1989 | Dessau et al. | ................. 502/66 |
| 5,961,951 A | | 10/1999 | Kennedy et al. | |
| 2006/0210472 A1 | | 9/2006 | Hastoy et al. | |
| 2008/0314797 A1 | * | 12/2008 | Sinclair et al. | ................ 208/49 |
| 2009/0076317 A1 | * | 3/2009 | Lai et al. | .................... 585/852 |

FOREIGN PATENT DOCUMENTS

| | | |
|---|---|---|
| EP | 1 702 888 A1 | 9/2006 |
| WO | WO 99/35087 A1 | 7/1999 |

* cited by examiner

*Primary Examiner*—David M Brunsman
(74) *Attorney, Agent, or Firm*—Millen, White, Zelano & Branigan, P.C.

(57) ABSTRACT

The invention concerns a crystalline solid designated IZM-1, which has the X ray diffraction diagram given below. Said solid has a chemical composition, expressed as the anhydrous base in terms of moles of oxides by the formula $XO_2$: $aY_2O_3$; $bM_{2/n}O$ where X represents at least one tetravalent element, Y represents at least one trivalent element and M is an alkali metal and/or an alkaline-earth metal with valency n, a and b respectively representing the number of moles of $Y_2O_3$ and $M_{2/n}O$; a is in the range 0 to 0.02 and b is in the range 0 to 1.

3 Claims, 1 Drawing Sheet

IZM-1 CRYSTALLINE SOLID AND A PROCESS FOR ITS PREPARATION

TECHNICAL FIELD

The present invention relates to a novel microporous crystalline solid hereinafter termed IZM-1, to a process for preparing said solid and to the use of said solid as a catalyst, adsorbant or separation agent.

PRIOR ART

Microporous crystalline materials such as zeolites or silicoaluminophosphates are solids which are widely used in the oil industry as catalysts, catalyst supports, adsorbants or separation agents. Although many microporous crystalline structures have been discovered, the refining and petrochemicals industry is constantly researching novel zeolitic structures which have particular properties for applications such as purification or separation of gas, or the conversion of carbonaceous or other species.

Microporous aluminosilicates are generally prepared from an aqueous reaction mixture containing alkali or alkaline-earth cations, organic species such as amines or quaternary ammonium compounds, metal oxides, silicon and aluminium.

DESCRIPTION OF THE INVENTION

The present invention concerns a novel crystalline solid termed IZM-1 crystalline solid, having a novel crystalline structure. Said solid has a chemical composition, expressed as the anhydrous base in terms of moles of oxides defined by the following general formula: $XO_2: aY_2O_3; bM_{2/n}O$, in which X represents at least one tetravalent element, Y represents at least one trivalent element and M is an alkali metal and/or an alkaline-earth metal with valency n, a and b respectively representing the number of moles of $Y_2O_3$ and $M_{2/n}O$; a is in the range 0 to 0.02 and b is in the range 0 to 1.

The IZM-1 crystalline solid of the invention has an X ray diffraction diagram which includes at least the peaks set out in Table 1. This novel IZM-1 crystalline solid has a novel crystalline structure.

This diffraction diagram is obtained by radiocrystallographic analysis using a diffractometer employing the conventional powder technique with the Kα1 peak of copper (λ=1.5406 Å). From the position of the diffraction peaks represented by the angle 2θ, using the Bragg relationship, the characteristic interplanar spacings $d_{hkl}$ of the sample are calculated. The error estimation in the measurement $\Delta(d_{hkl})$ of $d_{hkl}$ is calculated by the Bragg relationship as a function of the absolute error $\Delta(2\theta)$ in the measurement of 2θ. An absolute error $\Delta(2\theta)$ of ±0.02° is normally acceptable. The relative intensity $I/I_0$ in each value of $d_{hkl}$ is measured from the height of the corresponding diffraction peak. The X ray diffraction diagram of the IZM-1 crystalline solid of the invention comprises at least the peaks at values of $d_{hkl}$ given in Table 1. In the $d_{hkl}$ column, the mean values of the interplanar spacings are shown in Angstroms (Å). Each of these values must be supplemented with an error measurement $\Delta(d_{hkl})$ between ±0.6 Å and ±0.01 Å.

TABLE 1

Mean values of $d_{hkl}$ and relative intensities measured on an X ray diffraction diagram of the calcined IZM-1 crystalline solid of the invention

| 2 theta (°) | $d_{hkl}$ (Å) | $I/I_0$ |
|---|---|---|
| 7.60 | 11.62 | Vs |
| 8.78 | 10.06 | Mw |
| 10.74 | 8.23 | Vw |
| 11.43 | 7.74 | Vw |
| 12.45 | 7.11 | Vw |
| 14.60 | 6.06 | Vw |
| 15.24 | 5.81 | W |
| 16.93 | 5.23 | Vw |
| 17.62 | 5.03 | Vw |
| 18.15 | 4.88 | Vw |
| 18.73 | 4.73 | Vw |
| 19.15 | 4.63 | Vw |
| 20.76 | 4.27 | Vw |
| 21.22 | 4.18 | Vs |
| 21.68 | 4.10 | W |
| 22.58 | 3.94 | Vw |
| 22.96 | 3.87 | S |
| 23.26 | 3.82 | W |
| 24.52 | 3.63 | Vw |
| 25.03 | 3.56 | Vw |
| 25.44 | 3.50 | Vw |
| 25.82 | 3.45 | Vw |
| 26.24 | 3.39 | Vw |
| 26.56 | 3.35 | Vw |
| 29.14 | 3.06 | Vw |
| 29.45 | 3.03 | Vw |
| 30.79 | 2.90 | Vw |
| 31.45 | 2.84 | Vw |
| 31.72 | 2.82 | Vw |
| 33.04 | 2.71 | Vw |
| 33.60 | 2.67 | Vw |
| 34.22 | 2.62 | Vw |
| 36.28 | 2.47 | Vw |
| 37.14 | 2.42 | Vw |
| 38.50 | 2.34 | Vw | in which:
Vs = very strong;
S = strong;
M = medium;
Mw = medium weak;
W = weak;
Vw = very weak.

The relative intensity $I/I_0$ is given with respect to a relative intensity scale where a value of 100 is attributed to the most intense peak in the X ray diffraction diagram: Vw<15 15≦W<30; 30≦Mw<50; 50≦M<65; 65≦S<85; Vs≧85.

The IZM-1 crystalline solid of the invention has a novel basic crystalline structure or topology which is characterized by its X ray diffraction diagram in the calcined form given in FIG. 1.

Said IZM-1 solid has a chemical composition expressed as the anhydrous base in terms of moles of oxides defined by the following general formula: $XO_2: aY_2O_3; bM_{2/n}O$, in which X represents at least one tetravalent element, Y represents at least one trivalent element and M is an alkali metal and/or an alkaline-earth metal with valency n. In said formula, a represents the number of moles of $Y_2O_3$ and is in the range 0 to 0.02, more preferably in the range 0 to 0.01 and still more preferably in the range 0.0005 to 0.003, and b represents the number of moles of $M_{2/n}O$ and is in the range 0 to 1, more preferably in the range 0 to 0.5 and still more preferably in the range 0.05 to 0.5. In accordance with the invention, when a is non-zero, b is also non-zero.

In accordance with the invention, X is preferably selected from silicon, germanium, titanium and a mixture of at least two of these elements; more preferably, X is silicon and Y is preferably selected from aluminium, boron, iron, indium and gallium; more preferably, Y is aluminium. M is preferably selected from lithium, sodium, potassium, calcium, magnesium and a mixture of at least two of said metals; more preferably, M is sodium. In accordance with the invention, the metal M is advantageously present when the IZM-1 solid comprises the element Y. Preferably, X represents silicon, and the IZM-1 crystalline solid of the invention is then an entirely siliceous solid when element Y is absent from the composition of said solid IZM-1. It is also advantageous to use, as the element X, a mixture of several elements X, in particular a mixture of silicon with another element X selected from germanium and titanium, preferably germanium. Thus, when silicon is present as a mixture with another element X, the IZM-1 crystalline solid of the invention is then a crystalline metallosilicate having an X ray diffraction diagram identical to that described in Table 1 when it is in its calcined form. More preferably again, and in the presence of an element Y, X is silicon and Y is aluminium: the IZM-1 crystalline solid of the invention is then a crystalline aluminosilicate having an X ray diffraction diagram identical to that described in Table 1 when it is in its calcined form.

More generally, said IZM-1 solid of the invention has a chemical composition expressed by the following general formula: $XO_2$: $aY_2O_3$; $bM_{2/n}O$: $cR$; $c'S$; $dH_2O$, in which R and S represent different organic species, X represents at least one tetravalent element, Y represents at least one trivalent element and M is an alkali metal and/or an alkaline-earth metal with valency n; a, b, c, c' and d respectively represent the number of moles of $Y_2O_3$, $M_{2/n}O$, R, S and $H_2O$ and a is in the range 0 to 0.02, b is in the range 0 to 1, c is in the range 0 to 5, c' is in the range 0 to 50 and d is in the range 0 to 70. This formula and the values taken by a, b, c, c' and d are those for which said IZM-1 solid is preferentially in its calcined form.

More precisely, said solid IZM-1 in its as-synthesized form has a chemical composition expressed by the following chemical formula: $XO_2$: $aY_2O_3$; $M_{2/n}O$: $cR$; $c'S$; $dH_2O$ (I), in which R and S represent different organic species, X represents at least one tetravalent element, Y represents at least one trivalent element and M is an alkali metal and/or an alkaline-earth metal with valency n; a, b, c, c' and d respectively represent the number of moles of $Y_2O_3$, $M_{2/n}O$, R, S and $H_2O$ and a is in the range 0 to 0.02, b is in the range 0 to 1, c is in the range 0.005 to 2, c' is in the range 0.01 to 5 and d is in the range 0.005 to 2.

In formula (I) given above to define the chemical composition of the IZM-1 crystalline solid in its as-synthesized form, the value of a is in the range 0 to 0.02, more preferably in the range 0 to 0.01 and still more preferably in the range 0.0005 to 0.003. Preferably, b is in the range 0 to 1; more preferably, b is in the range 0 to 0.5 and still more preferably b is in the range 0.05 to 0.5. The value of c is in the range 0.005 to 2, advantageously in the range 0.02 to 1. The value of c' is in the range 0.01 to 5, more preferably in the range 0.02 to 2. The value taken by d is in the range 0.005 to 2, preferably in the range 0.01 to 1.

In its as-synthesized form, i.e. directly from synthesis and prior to any calcining step(s) and optional ion exchange step(s) which are well known to the skilled person, said IZM-1 solid comprises at least the organic species as described below or precursors thereof. In a preferred mode of the invention, in formula (I) above, the element R is 6-(dibutylamino)-1,8-diazabicyclo[5.4.0]undec-7-ene the developed formula for which is given below, and the element S is ethylene glycol, $OH-CH_2-CH_2-OH$. Said organic species R and S, which act as templates, may be eliminated by conventional means which are known in the art, such as heat treatments and/or chemical treatments.

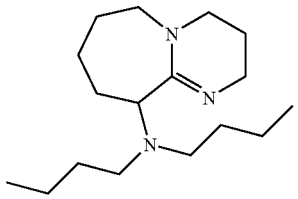

The IZM-1 crystalline solid of the invention is preferably a zeolitic solid.

The invention also concerns a process for preparing an IZM-1 crystalline solid of the invention in which the following are reacted: an aqueous mixture comprising at least one source of at least one oxide $XO_2$, optionally at least one source of at least one oxide $Y_2O_3$, optionally at least one source of at least one alkali and/or alkaline-earth cation with valency n, optionally at least one source of hydroxide ions, at least two different organic species R and S, the mixture preferably having the following molar composition:

| | |
|---|---|
| $XO_2/Y_2O_3$ | at least 50, preferably at least 100; |
| $H_2O/XO_2$ | 1 to 70, preferably 2 to 50; |
| $R/XO_2$ | 0.02 to 5, preferably 0.05 to 1; |
| $S/XO_2$ | 1 to 50, preferably 5 to 30; |
| $M_{2/n}O/XO_2$ | 0 to 1, preferably 0.05 to 0.5. | where X is one or more tetravalent element(s) selected from the group formed by the following elements: silicon, germanium and titanium, preferably silicon, where Y is one or more trivalent element(s) selected from the group formed by the following elements: aluminium, iron, boron, indium and gallium, preferably aluminium, and where M is an alkali and/or alkaline-earth metal with valency n selected from lithium, sodium, potassium, calcium, magnesium and a mixture of at least two of these metals; preferably, M is sodium.

In accordance with the process of the invention, R and S are organic species which act as organic templates. Preferably, R is the nitrogen-containing compound 6-(dibutylamino)-1,8-diazabicyclo[5.4.0]undec-7-ene and S is ethylene glycol.

The source of the element X may be any compound comprising the element X which can liberate that element in aqueous solution in the reactive form. Advantageously, when the element X is silicon, the silica source may be any one of those currently used in synthesizing zeolites, for example solid powdered silica, silicic acid, colloidal silica, dissolved silica, or tetraethoxysilane (TEOS). Of the powdered silicas, it is possible to use precipitated silicas, in particular those obtained by precipitation from a solution of an alkali metal silicate, such as aerosil silicas, pyrogenic silicas, for example "CAB-O-SIL", and silica gels. It is possible to use colloidal silicas having different particle sizes, for example with a mean equivalent diameter in the range 10 to 15 nm or between 40 and 50 nm, such as those sold under trade names such as "LUDOX". Preferably, the silicon source is LUDOX-HS-40.

The source of element Y may be any compound comprising the element Y which may liberate that element in aqueous solution in the reactive form. In the preferred case in which Y is aluminium, the source of alumina is preferably sodium aluminate, or an aluminium salt, for example the chloride, nitrate, hydroxide or sulphate, an aluminium alkoxide or alumina proper, preferably in the hydrated or hydratable form, such as colloidal alumina, pseudoboehmite, gamma alumina or alpha or beta trihydrate. It is also possible to use mixtures of the sources cited above.

The source of the alkali and/or alkaline-earth metal M with valency n is advantageously a halide or a hydroxide of said metal M.

In a preferred implementation of the process of the invention, an aqueous mixture comprising the following is reacted: an oxide of silicon, optionally alumina, 6-(dibutylamino)-1,8-diazabicyclo[5.4.0]undec-7-ene, ethylene glycol and sodium hydroxide.

The process of the invention consists of preparing an aqueous reaction mixture known as a gel and comprising at least one source of at least one oxide $XO_2$, optionally at least one source of at least one oxide $Y_2O_3$, optionally at least one source of at least one alkali and/or alkaline-earth metal with valency n, optionally at least one source of hydroxide ion and at least two different organic species R and S. The quantities of said reagents are adjusted so as to provide said gel with a composition allowing it to crystallize into the IZM-1 crystalline solid in the as-synthesized form with general formula (I) $XO_2$: $aY_2O_3$; $bM_{2/n}O$; $dR$; $c'S$: $dH_2O$, where a, b, c, c' and d satisfy the criteria defined above when c, c' and d are greater than 0. Next, the gel undergoes a hydrothermal treatment until the IZM-1 crystalline solid forms. The gel is advantageously subjected to hydrothermal conditions under autogenous pressure, optionally by adding gas, for example nitrogen, at a temperature in the range 120° C. to 200° C., preferably in the range 140° C. to 180° C., and still more preferably at a temperature which does not exceed 175° C. until the solid IZM-1 crystals of the invention are formed in the as-synthesized form. The time necessary to obtain crystallization generally varies between 1 hour and several months depending on the composition of the reagents in the gel, stirring and the reaction temperature. The reaction is generally carried out with stirring or in the absence of stirring, preferably in the presence of stirring.

It may be advantageous to add seeds to the reaction mixture to reduce the time necessary for the formation of crystals and/or to reduce the total crystallization period. It may also be advantageous to use seeds to encourage the formation of IZM-1 crystalline solid, to the detriment of impurities. Such seeds comprise solid crystals, preferably crystals of solid IZM-1. The crystalline seeds are generally added in a proportion in the range 0.01% to 10% by weight of oxide $XO_2$ used in the reaction mixture.

At the end of the hydrothermal treatment step resulting in crystallization of the IZM-1 solid, the solid phase is filtered, washed, dried then calcined. The calcining step is advantageously implemented by means of one or more heating steps carried out at a temperature in the range 100° C. to 1000° C., preferably in the range 400° C. to 650° C., for a period in the range from a few hours to several days, preferably in the range 3 hours to 48 hours. Preferably, calcining is carried out in two consecutive heating steps.

At the end of said calcining step, the IZM-1 solid obtained is that with an X ray diffraction diagram including at least the peaks set out in Table 1. It is free of water and of the organic species R and S present in the solid IZM-1 in the as-synthesized form.

The solid IZM-1 in its calcined form is then ready for subsequent steps such as dehydration and/or ion exchange. For these steps, any conventional method known to the skilled person may be used.

In general, the M cation(s) of the solid IZM-1 may be replaced by one or more cation(s) of any metal and in particular those from groups IA, IB, IIA, IIB, IIIA, IIIB (including the rare earths), VIII (including the noble metals) as well as lead, tin and bismuth. Exchange is normally carried out with a solution containing a hydrosoluble salt of an appropriate cation.

It is also advantageous to obtain the hydrogen form of the IZM-1 crystalline solid of the invention. Said hydrogen form may be obtained by carrying out ion exchange with an acid, in particular a strong mineral acid such as hydrochloric acid, sulphuric acid or nitric acid, or with an ammonium salt such as ammonium chloride, sulphate or nitrate. Ion exchange may be carried out by suspending solid IZM-1 in its calcined form once or more times with the ion exchange solution. In particular, when an ammonium salt is used to carry out ion exchange, ion exchange is preferably followed by a calcining step in a stream of dry air, at a temperature generally in the range from about 400° C. to 500° C. to generate the formation of protons in the IZM-1 solid by desorption of ammonia, thus resulting in the hydrogen form.

The present invention also concerns the use of the IZM-1 solid of the invention as an adsorbant to control pollution or as a molecular sieve for separation. It is also advantageously used as an acidic solid to catalyze reactions, for example those involved in refining and petrochemistry.

Thus, the present invention also pertains to an adsorbant comprising the IZM-1 crystalline solid of the invention. When it is used as an adsorbant, the IZM-1 crystalline solid of the invention is generally dispersed in an inorganic matrix phase which contains channels and cavities which allow the fluid to be separated to access the crystalline solid. These matrices are preferably mineral oxides, for example silicas, aluminas, silica-aluminas or clays. The matrix generally represents 2% to 25% of the mass of the adsorbant thus formed.

The present invention also pertains to a catalyst comprising the IZM-1 crystalline solid of the invention, preferably in its hydrogen form. When it is used as a catalyst, the IZM-1 crystalline solid of the invention may be associated with an inorganic matrix, which may be inert or catalytically active, and with a metallic phase. The inorganic matrix may be present simply as a binder to maintain the assembly of small particles of the IZM-1 crystalline solid in the various known forms for catalysts (extrudates, pellets, beads, powders), or it may be added as a diluent to impose a degree of conversion in a process which otherwise would progress too rapidly, leading to choking of the catalyst as a result of too much coke formation. Typical inorganic matrices are support materials for the catalysts such as the various forms of silica, alumina, silica-alumina, magnesia, zirconia, oxides of titanium, boron, aluminium, titanium or zirconium phosphates, clays such as kaolin, bentonite, montmorillonite, sepiolite, attapulgite, fuller's earth, porous synthetic materials such as $SiO_2$—$Al_2O_3$, $SiO_2$—$ZrO_2$, $SiO_2$—$ThO_2$, $SiO_2$—$BeO$, $SiO_2$—$TiO_2$, or any combination of these compounds. The inorganic matrix may be a mixture of different compounds, in particular an inert phase and an active phase. The inorganic matrix may be a mixture of different compounds, in particular an inert phase and an active phase.

The IZM-1 crystalline solid may also be associated with at least one other zeolite and act as a principal active phase or additive.

Any forming method which is known to the skilled person would be suitable for the present catalyst. As an example, pelletization or extrusion or head formation could be used. A catalyst containing the IZM-1 solid of the invention which is advantageously at least partially in the acid form is generally formed so that the catalyst is preferably in the form of extrudates or beads having regard to its subsequent use.

The metallic phase may be integrally introduced onto the IZM-1 solid of the invention. It may also be integrally introduced onto the inorganic matrix or onto the inorganic matrix-IZM-1 crystalline solid assembly by ion exchange or impregnation with cations or oxides selected from the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic table. The metals may be introduced either all in the same manner or using different techniques, at any time during the preparation of the catalyst comprising the IZM-1 solid of the invention, before or after forming and in any order. Further, intermediate treatments such as, for example, calcining and/or reduction may be applied between the deposits of the various metals.

The catalytic compositions comprising the IZM-1 solid are generally suitable for carrying out the principal hydrocarbon transformation processes and compound synthesis reactions. Said catalytic compositions are advantageously of application in hydroconversion reactions with the aim of improving the pour point of the feed, which reactions are termed dewaxing. These reactions can convert a feed having a high pour point into a product with a lower pour point. These reactions are thus applicable, for example, in reducing the pour point of the gas oils. They can also reduce the pour point of heavier feeds to obtain base oils with good cold properties and a high viscosity index.

The invention is illustrated in the following examples which are not in any way limiting in nature.

BRIEF DESCRIPTION OF DRAWINGS

A diffraction diagram of a solid of the invention is set forth in FIG. 1.

EXAMPLE 1

Figure 1:
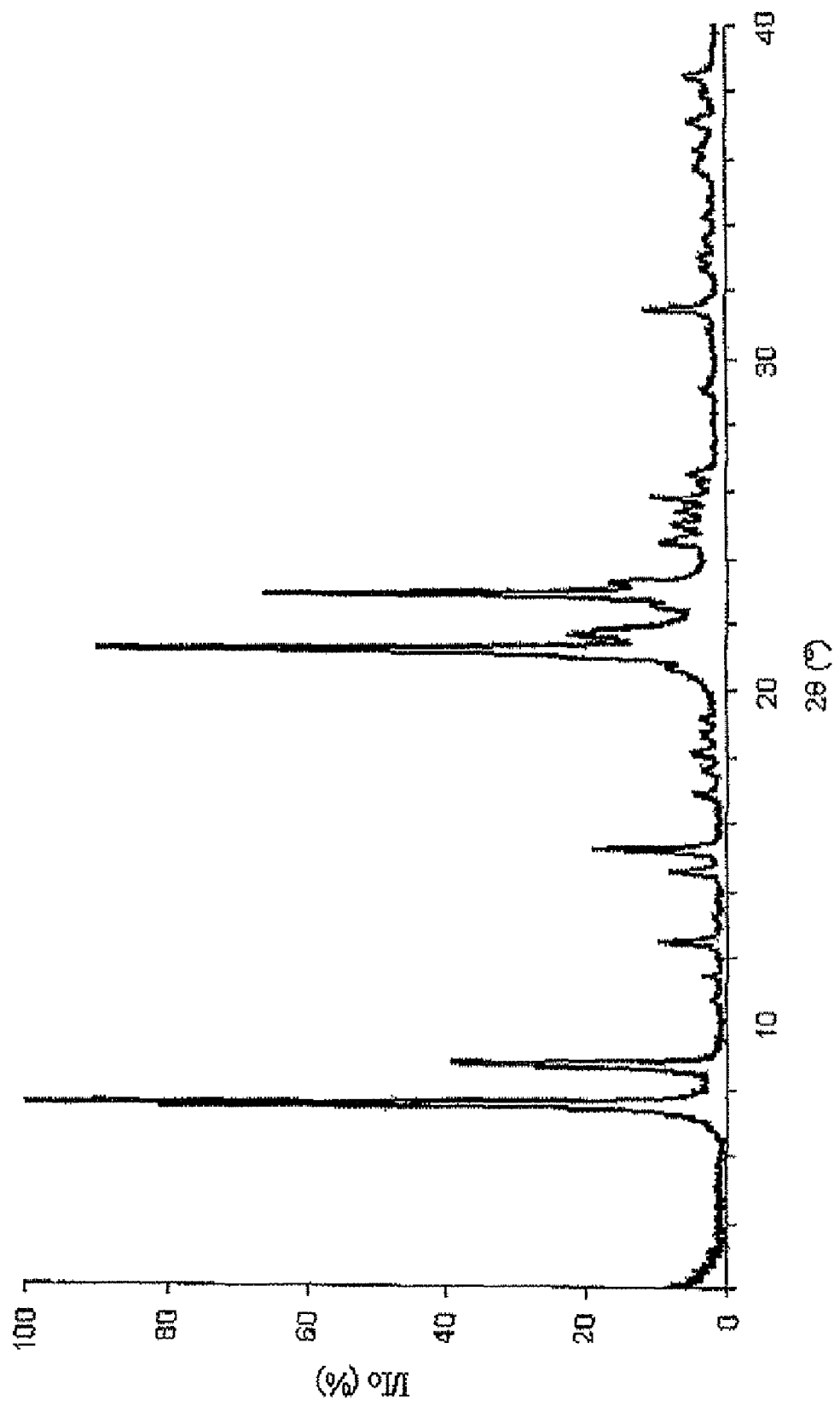

Preparation of an IZM-1 Solid of the Invention 17.44 g of a solution of silica, known under the trade name ©Ludox HS-40 sold by Aldrich, was incorporated into a solution composed of 0.83 g of sodium hydroxide (Prolabo), 3.62 g of 6-(dibutylamino)-1,8-diazabicyclo[5.4.0]undec-7-ene (Aldrich), 89.29 g of ethylene glycol in 7.26 g of deionized water. The molar composition of the mixture was as follows: $SiO_2$; 0.10 $Na_2O$; 0.11 R; 9.83 S; 8.52 $H_2O$. The mixture was stirred vigorously for half an hour. The mixture was then transferred into an autoclave following homogenization. The autoclave was heated for 6 days at 175° C. with stirring (500 rpm). The crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by solid IZM-1. The diffraction diagram for the calcined solid IZM-1 is shown in FIG. 1.

EXAMPLE 2

Preparation of an IZM-1 Solid of the Invention 13.87 g of a solution of silica, known under the trade name ©Ludox HS-40 sold by Aldrich, was incorporated into a solution composed of 0.668 g of sodium hydroxide (Prolabo), 3.11 g of 6-(dibutylamino)-1,8-diazabicyclo[5.4.0]undec-7-ene (Aldrich), 71.19 g of ethylene glycol in 11.16 g of deionized water. The molar composition of the mixture was as follows: $SiO_2$; 0.10 $Na_2O$; 0.12 R; 12.42 S; 11.75 $H_2O$. The mixture was stirred vigorously for half an hour. The mixture was then transferred into an autoclave following homogenization. The autoclave was heated for 5 days at 170° C. with stirring (500 rpm). The IZM-1 crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by IZM-1 solid. The diffraction diagram for the calcined IZM-1 solid is shown in FIG. 1.

EXAMPLE 3

Preparation of an IZM-1 Solid of the Invention 13.87 g of a solution of silica, known under the trade name ©Ludox HS-40 sold by Aldrich, was incorporated into a solution composed of 0.66 g of sodium hydroxide (Prolabo), 0.021 g of sodium aluminate (Carlo Erba), 3.11 g of 6-(dibutylamino)-1,8-diazabicyclo[5.4.0]undec-7-ene (Aldrich), 71.19 g of ethylene glycol in 11.16 g of deionized water. The molar composition of the mixture was as follows: $SiO_2$; 0.016 $Al_2O_3$; 0.10 $Na_2O$; 0.12 R; 12.42 S; 11.75 $H_2O$. The mixture was stirred vigorously for half an hour. The mixture was then transferred into an autoclave following homogenization. The autoclave was heated for 5 days at 170° C. with stirring (500 rpm). The crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by IZM-1 solid. The diffraction diagram for the calcined IZM-1 solid is shown in FIG. 1.

EXAMPLE 4

Preparation of an Adsorbant Comprising the IZM-1 Solid

The calcined solid of Example 1 was formed into extrudates by mixing with boehmite (Pural SB3, Sasol) in a Z arm mixer and extruding the paste obtained with a piston extruder. The extrudates were then dried at 120° C. for 12 h in air and calcined at 550° C. for 2 hours in a stream of air in a muffle furnace.

The adsorbant thus prepared was composed of 80% of zeolitic solid IZM-1 and 20% of alumina.

EXAMPLE 5

Preparation of a Catalyst Comprising the IZM-1 Solid

The catalyst was prepared from the IZM-1 solid of Example 3. The solid underwent three ion exchange steps in a solution of 10N $NH_4NO_3$ at about 100° C. for 4 hours for each exchange. At the end of these treatments, the solid in the $NH_4$ form had an overall Si/Al atomic ratio of close to 35, and a sodium weight content with respect to the weight of dry zeolite of 130 ppm. The solid was then formed by extrusion (extrusion diameter 1.4 mm) with an alumina gel to obtain, after drying and calcining in dry air, a support which contained 10% by weight of IZM-1 solid in the hydrogen form and 90% alumina.

This support underwent anionic exchange with hexachloroplatinic acid in the presence of a competing agent (hydrochloric acid) to deposit 0.3% by weight of platinum with respect to the catalyst. Next, the moist solid was dried at 120° C. for 12 hours and calcined in a stream of dry air at a temperature of 500° C. for one hour.

The catalyst obtained contained, by weight, 10.0% of IZM-1 in the hydrogen form, 89.7% of alumina and 0.3% of platinum.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

The entire disclosures of all applications, patents and publications, cited herein and of corresponding French application No. 07/00.698, filed Jan. 30, 2007 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparing an IZM-1 crystalline solid comprising mixing in an aqueous medium at least one source of at least one oxide $XO_2$, optionally at least one source of at least one oxide $Y_2O_3$, optionally at least one source of at least one alkali and/or alkaline-earth metal with valency n, optionally at least one source of hydroxide ions and at least two different organic species R and S, hydrothermal treatment of said mixture until said IZM-1 crystalline solid forms, followed by filtration, washing, drying and calcining steps, wherein R is 6-(dibutylamino)-1,8-diazabicyclo[5.4.0]undec-7-ene and S is ethylene glycol, HO—$CH_2$—$CH_2$—OH, said IZM-1 crystalline solid having an X ray diffraction diagram including at least the peaks set out in the table below:

| 2 theta (°) | $d_{hkl}$ (Å) | $I/I_0$ |
|---|---|---|
| 7.60 | 11.62 | Vs |
| 8.78 | 10.06 | Mw |
| 10.74 | 8.23 | Vw |
| 11.43 | 7.74 | Vw |
| 12.45 | 7.11 | Vw |
| 14.60 | 6.06 | Vw |
| 15.24 | 5.81 | W |
| 16.93 | 5.23 | Vw |
| 17.62 | 5.03 | Vw |
| 18.15 | 4.88 | Vw |
| 18.73 | 4.73 | Vw |
| 19.15 | 4.63 | Vw |
| 20.76 | 4.27 | Vw |
| 21.22 | 4.18 | Vs |
| 21.68 | 4.10 | W |
| 22.58 | 3.94 | Vw |
| 22.96 | 3.87 | S |
| 23.26 | 3.82 | w |
| 24.52 | 3.63 | Vw |
| 25.03 | 3.56 | Vw |
| 25.44 | 3.50 | Vw |
| 25.82 | 3.45 | Vw |
| 26.24 | 3.39 | Vw |
| 26.56 | 3.35 | Vw |
| 29.14 | 3.06 | Vw |
| 29.45 | 3.03 | Vw |
| 30.79 | 2.90 | Vw |
| 31.45 | 2.84 | Vw |
| 31.72 | 2.82 | Vw |
| 33.04 | 2.71 | Vw |
| 33.60 | 2.67 | Vw |
| 34.22 | 2.62 | Vw |
| 36.28 | 2.47 | Vw |
| 37.14 | 2.42 | Vw |
| 38.50 | 2.34 | Vw | in which: Vs=very strong; S=strong; M=medium; Mw=medium weak; W=weak; Vw=very weak, and having a chemical composition, expressed as the anhydrous base in terms of moles of oxides, defined by the following general formula: $XO_2$: $aY_2O_3$; $bM_{2/n}O$ in which X represents at least one tetravalent element, Y represents at least one trivalent element and M is an alkali metal and/or an alkaline-earth metal with valency n, a and b respectively representing the number of moles of $Y_2O_3$ and $M_{2/n}O$; a is in the range 0 to 0.02 and b is in the range 0 to 1.

2. A process for preparing an IZM-1 crystalline solid according to claim 1, in which the molar composition of the reaction mixture is such that:

| | |
|---|---|
| $XO_2/Y_2O_3$ | at least 50; |
| $H_2O/XO_2$ | 1 to 70; |
| $R/XO_2$ | 0.02 to 5; |
| $S/XO_2$ | 1 to 50; |
| $M_{2/n}O/XO_2$ | 0 to 1. |

3. A process for preparing an IZM-1 crystalline solid according to claim 1, in which seeds are added to the reaction mixture.

* * * * *